(12) United States Patent
Katou (10) Patent No.: US 6,705,155 B2
(45) Date of Patent: Mar. 16, 2004

(54) APPARATUS AND METHOD FOR MONITORING TIRE CONDITION

(75) Inventor: Michiya Katou, Ogaki (JP)

(73) Assignee: Pacific Industrial Co., Ltd. (JP)

( * ) Notice: Subject to any disclaimer, the term of this patent is extended or adjusted under 35 U.S.C. 154(b) by 0 days.

(21) Appl. No.: 09/957,229

(22) Filed: Sep. 20, 2001

(65) Prior Publication Data
US 2002/0073771 A1 Jun. 20, 2002

(30) Foreign Application Priority Data

Dec. 15, 2000 (JP) .................................... 2000-381802
May 31, 2001 (JP) .................................... 2001-163634

(51) Int. Cl.[7] ............................................ G01M 17/02
(52) U.S. Cl. ................... 73/146; 73/146.3; 73/146.4; 73/146.5
(58) Field of Search ........................ 73/146, 146.5, 73/146.2, 146.8, 146.4, 146.3, 48

(56) References Cited

U.S. PATENT DOCUMENTS

| | | | | |
|---|---|---|---|---|
| 4,852,419 A | * | 8/1989 | Kittel et al. | ............... 74/89.14 |
| 5,289,160 A | * | 2/1994 | Fiorletta | ..................... 73/146.5 |
| 5,808,190 A | * | 9/1998 | Ernst | ......................... 73/146.5 |
| 5,880,363 A | * | 3/1999 | Meyer et al. | ............... 73/146.5 |
| 5,883,305 A | * | 3/1999 | Jo et al. | ..................... 73/146.5 |
| 6,112,585 A | | 9/2000 | Schrottle et al. | |
| 6,446,502 B1 | | 9/2002 | Normann et al. | |

FOREIGN PATENT DOCUMENTS

| | | |
|---|---|---|
| DE | 198 56 861 A 1 | 6/2000 |
| EP | 0 760 299 A1 | 3/1997 |
| EP | 0 760 299 B1 | 3/1999 |
| JP | 10-104103 | 4/1998 |

* cited by examiner

Primary Examiner—Edward Lefkowitz
Assistant Examiner—Alandra Ellington
(74) Attorney, Agent, or Firm—Cook, Alex, McFarron, Manzo, Cummings & Mehler, Ltd.

(57) ABSTRACT

A transmitter device includes a rotational direction sensor that generates a specific pattern signal when a corresponding tire rotates. The pattern signal of the left tires is different from the pattern signal of the right tires. A front reception antenna is near the front tires. A rear reception antenna is near the rear tires. A receiver includes a switch circuit that selectively connects the front reception antenna or the rear reception antenna to a controller. When one transmitter device transmits a radio signal, the controller determines which transmitter device is the source of the radio signal in accordance with the level of the signals from the reception antennas and the pattern signal, which is included in the data transmitted by the transmitter device.

18 Claims, 4 Drawing Sheets

Fig.5(a) First Signaling Pattern

Fig.5(b) Second Signaling Pattern

APPARATUS AND METHOD FOR MONITORING TIRE CONDITION

BACKGROUND OF THE INVENTION

The present invention relates to apparatuses and methods for monitoring the condition of a tire in a vehicle, and, more particularly, to techniques for determining which of several transmitter devices located respectively in the tires has transmitted data.

Conventionally, the condition of each tire is monitored in a passenger compartment of the vehicle using a wireless tire condition monitoring apparatus. More specifically, a transmitter device is attached to each tire. The transmitter device measures, for example, the pressure and temperature in the corresponding tire. The transmitter device wirelessly transmits data that represents the measurements, or the condition of the tire. A receiver is installed in the vehicle's body frame and receives data from the transmitter devices.

Each transmitter device transmits data that represents the condition of the corresponding tire to the single receiver. When the receiver receives data from one transmitter device, the receiver must determine which tire corresponds to the data. For this purpose, each transmitter device has a specific identification code (ID code). The transmitter device transmits the ID code together with the data that represents the condition of the tire. The receiver thus determines which transmitter device has transmitted the data in accordance with the ID code.

However, in this case, the receiver must pre-store the ID codes of the transmitter devices that are attached to the corresponding tires. Further, when performing an initial entry of the ID codes in the receiver, each ID code must be associated with the position of the tire corresponding to the transmitter device that matches the ID code. Thus, every time a tire is replaced or the position of the tire is changed with respect to the vehicle, the initial entry must be repeated. Since this initial entry is done manually, the operation is complicated and time-consuming.

BRIEF SUMMARY OF THE INVENTION

Accordingly, it is an objective of the present invention to provide an apparatus and a method for monitoring the condition of a tire that automatically determine which transmitter device has transmitted data, thus making it unnecessary to perform an initial entry of transmitter devices' ID codes.

To achieve the foregoing and other objectives and in accordance with the purpose of the present invention, the invention provides a tire condition monitoring apparatus for monitoring the condition of a plurality of tires attached to a vehicle. The tires include left and right front tires and left and right rear tires. A transmitter device is attached to each tire. The transmitter device has a condition sensor that detects the condition of the corresponding tire and a signal generator that generates a specific pattern signal when the tire rotates. The pattern signal generated by the signal generator of the transmitter device attached to each left tire is different from the pattern signal generated by the signal generator of the transmitter device attached to each right tire when the vehicle moves in a given direction. Each transmitter device transmits a radio signal that includes data that represents the tire condition and data that represents the pattern signal. A front reception antenna is installed in a body of the vehicle at a position that is relatively near to the left and right front tires. The front reception antenna receives radio signals from the transmitter devices. A rear reception antenna is installed in the vehicle body at a position that is relatively near to the left and right rear tires. The rear reception antenna receives radio signals from the transmitter devices. A receiver receives reception signals from the front and rear reception antennas. The receiver includes a controller. When one of the transmitter devices has transmitted a radio signal, the controller determines which transmitter device has transmitted the radio signal in accordance with the level of reception signals from the reception antennas and the data that represents the pattern signal, which is included in the radio signal transmitted by the transmitter device.

The present invention also provides a tire condition monitoring method for monitoring the condition of a plurality of tires attached to a vehicle. The tires include left and right front tires and left and right rear tires. The method includes detecting the condition of each tire; generating a specific pattern signal for each tire when the tires rotate, wherein the pattern signal generated for each left tire is different from the pattern signal generated for each right tire; transmitting a radio signal from one of the tires, the radio signal including data that represents the tire condition and data that represents the pattern signal; receiving the radio signal at a front location that is relatively near to the front tires; receiving the radio signal at a rear location that is relatively near to the rear tires; and determining which tire has transmitted the radio signal in accordance with the level of signals received at the front and rear locations and the data that represents the pattern signal, which is included in the transmitted radio signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
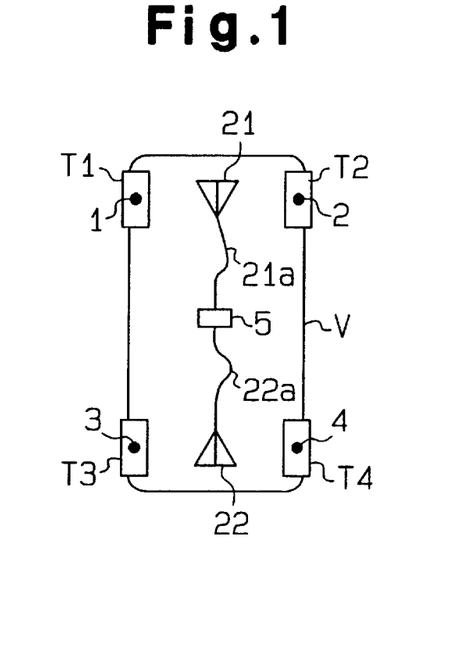
FIG. 1 is a view schematically showing the structure of a tire condition monitoring apparatus of an embodiment according to the present invention.

A first embodiment of the present invention will now be described with reference to FIGS. 1–6. As shown in FIG. 1, a vehicle V includes a left, front tire T1, a right, front tire T2, a left, rear tire T3, and a right, rear tire T4. A tire condition monitoring apparatus has first to fourth transmitter devices 1, 2, 3, 4 that are attached to the four tires T1, T2, T3, T4, respectively. The tire condition apparatus further includes a receiver 5 that is installed in a body frame of the vehicle V. Each transmitter device 1–4 is, for example, secured to the wheel of the corresponding tire T1–T4 and is located in the tire T1–T4. Each transmitter device 1–4 monitors the condition of the corresponding tire T1–T4, or measures the pressure and temperature in the tire T1–T4. Each transmitter device 1–4 then wirelessly transmits data that represents the measurements. The receiver 5 receives the data from the transmitter devices 1–4.

The first to fourth transmitter devices 1–4 are identical. Thus, only the first transmitter device 1 will be described by way of example with reference to FIG. 2. The transmitter device 1 includes a controller 10, which is, for example, a microcomputer. The controller 10 includes, for example, a central processing unit (CPU), a random access memory (RAM), and a read only memory (ROM). The ROM prestores an ID code of the first transmitter device 1. The ID code is used for distinguishing the first transmitter device 1 from the remaining transmitter devices 2 to 4.

Figure 2:
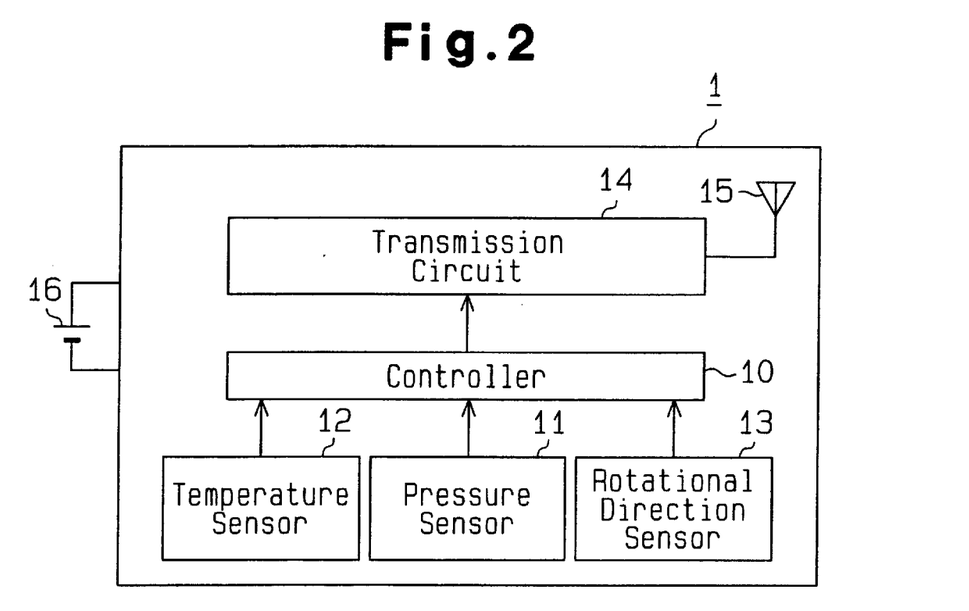
FIG. 2 is a block diagram showing a circuit of a transmitter device of the tire condition monitoring apparatus of FIG. 1.

A pressure sensor 11 measures the pressure in the corresponding tire, or the tire T1, and provides data that represents the measurement to the controller 10. A temperature sensor 12 measures the temperature in the tire T1 and provides data that represents the measurement to the controller 10. The pressure sensor 11 and the temperature sensor 12 each function as a condition detecting means or a condition sensor.

The controller 10 outputs data such as the data that represents the pressure measurement, the data that represents the temperature measurement, and data that includes the ID code stored in the ROM to a transmission circuit 14. The transmission circuit 14 encodes and modulates the data from the controller 10. The transmission circuit 14 then wirelessly transmits the data by a transmission antenna 15.

The transmitter device 1 includes a battery 16. The battery 16 supplies power to the transmitter device 1.

The controller 10 instructs the pressure sensor 11 and the temperature sensor 12 to measure the pressure or temperature in the tire T1 at predetermined time intervals (for example, every fifteen seconds). Further, every time the pressure sensor 11 completes a predetermined number of measurement cycles (for example, forty cycles), the controller 10 instructs the transmission circuit 14 to perform a periodic transmission. In addition, when determining that the pressure or temperature in the tire T1 is abnormal, the controller 10 instructs the transmission circuit 14 to transmit data, regardless of the periodic transmission intervals.

The timing at which each transmitter device 1–4 performs the periodic transmission is out of phase with the timing at which the other transmitter devices 1–4 each perform the periodic transmission. That is, it is unlikely that two or more transmitter devices T1–T4 perform the periodic transmission at the same time.

Figure 4A:
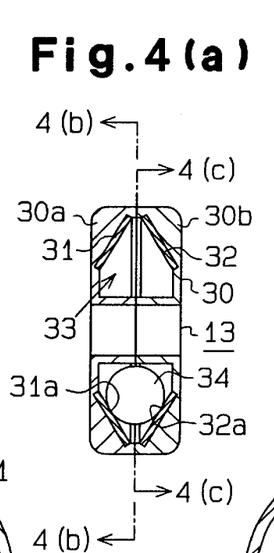
FIG. 4(a) is a cross-sectional view showing a rotational direction sensor located in the transmitter device of FIG. 2.
Figure 4B:
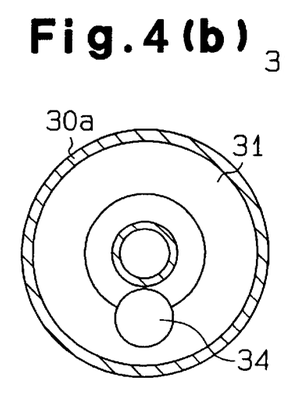
FIG. 4(b) is a cross-sectional view taken along line 4(b)—4(b) of FIG. 4(a)
Figure 4C:
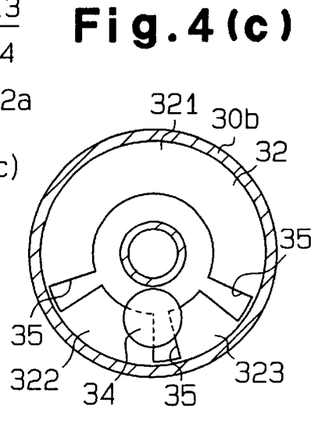
FIG. 4(c) is a cross-sectional view taken along line 4(c)—4(c) of FIG. 4(a)

A rotational direction sensor 13, which is a signal generating means or a signal generator, is connected to the controller 10. As shown in FIGS. 4(a), 4(b), and 4(c), the rotational direction sensor 13 includes a hollow, substantially donut-shaped case 30. The case 30 includes a pair of case members 30a, 30b that are coupled with each other to form an annular space in the case 30. An annular, base electrode plate 31 and an opposing annular, cut-away electrode plate 32 are received in the annular space in the case 30.

As shown in FIGS. 4(a) and 4(b), the base electrode plate 31 is secured to an inner wall of the case member 30a. As shown in FIGS. 4(a) and 4(c), the cut-away electrode plate 32 is secured to an inner wall of the case member 30b. As shown in FIG. 4(a), when the case members 30a, 30b are coupled with each other, an annular passage 33 that has a substantially V-shaped cross-sectional shape is formed between the electrode plates 31, 32.

A ball 34 is formed of conductive material and is located in the annular passage 33. The ball 34 rolls in the annular passage 33 to move circumferentially in the case 30. The base electrode plate 31 includes a contact surface 31a that contacts and supports the ball 34. Likewise, the cut-away electrode plate 32 includes a contact surface 32a that contacts and supports the ball 34. Each contact surface 31a, 32a forms a truncated conical surface. The ball 34 rolls along the contact surfaces 31a, 32b.

As shown in FIG. 4(b), the base electrode plate 31 is continuous in the circumferential direction and does not include any joints. In contrast, as shown in FIG. 4(c), the electrode plate 32 includes three cut-away portions 35, or non-conductive portions, that extend in radial directions. The cut-away portions 35 divide the cut-away electrode plate 32 into a first section 321, a second section 322, and a third section 323. The circumferential dimensions of the first to third sections 321 to 323 are different from one another. More specifically, the circumferential dimension of the first section 321 is larger than that of the second section 322. The circumferential dimension of the second section 322 is larger than that of the third section 323.

When the ball 34 is located at a position in the annular passage 33 that corresponds to any one of the first to third sections 321 to 323, the ball 34 contacts both electrode plates 31, 32, as shown in FIG. 4(a). In this state, the electrode plates 31, 32 are electrically connected to each other through the ball 34. The rotational direction sensor 13 thus sends a high-level signal to the controller 10. In contrast, when the ball 34 is located at a position in the annular passage 33 that corresponds to any one of the cut-away portions 35, the ball 34 contacts the base electrode plate 31 but not the cut-away electrode plate 32. In this state, the electrode plates 31, 32 are electrically disconnected from each other. The rotational direction sensor 13 thus sends a low-level signal to the controller 10.

Figure 5A:
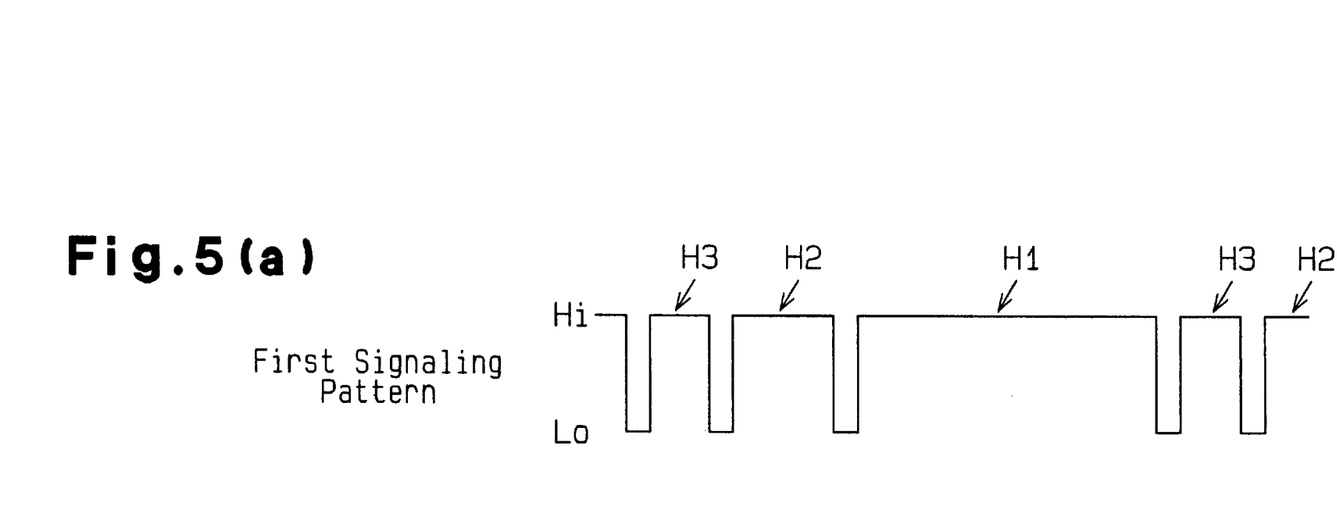
FIG. 5(a) is a timing chart showing a first signaling pattern of the rotational direction sensor.

As shown in FIG. 4(c), if the ball 34 moves clockwise in the annular passage 33, as viewed in the drawing, at a constant speed, the rotational direction sensor 13 generates signals in accordance with the shape of the cut-away electrode plate 32, as shown in FIG. 5(a). More specifically, in this state, the rotational direction sensor 13 generates a first high-level signal H1, a second high-level signal H2, and a third high-level signal H3. The first high-level signal H1 lasts for a time period that corresponds to the circumferential dimension of the first section 321. The second high-level signal H2 lasts for a time period that corresponds to the circumferential dimension of the second section 322. The third high-level signal H3 lasts for a time period that corresponds to the circumferential dimension of the third section 323.

When rolling clockwise in the annular passage 33, as viewed in FIG. 4(c), the ball 34 moves along the first section 321, the third section 323, and the second section 322, in this order. Thus, as shown in FIG. 5(a), the rotational direction sensor 13 generates the first high-level signal H1, the third high-level signal H3, and the second high-level signal H2, in this order. The signaling pattern shown in FIG. 5(a) is defined as a first signaling pattern.

Figure 5B:
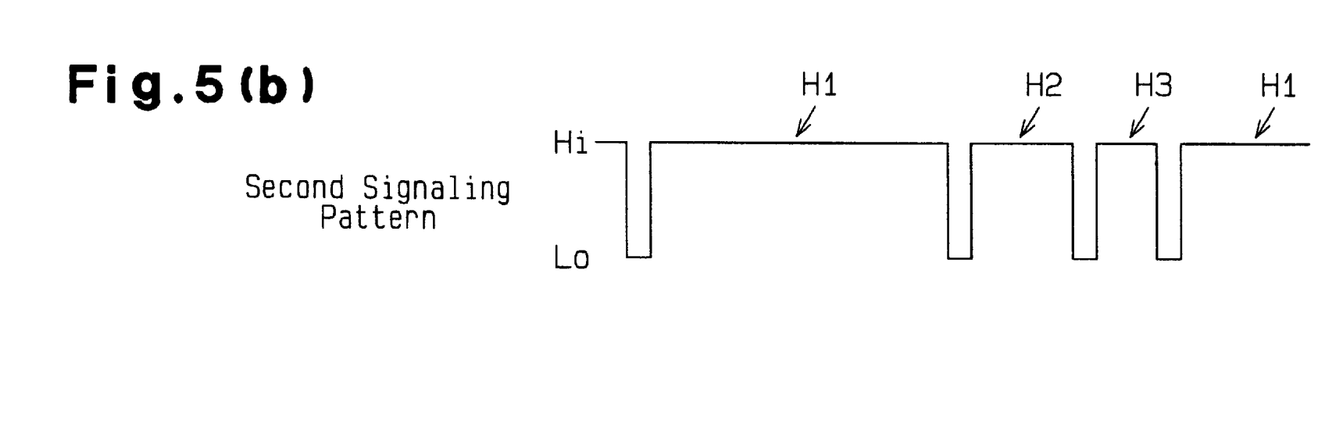
FIG. 5(b) is a timing chart showing a second signaling pattern of the rotational direction sensor.

In contrast, if the ball 34 rolls counterclockwise in the annular passage 33, as viewed in FIG. 4(c), at a constant speed, the ball 34 moves along the first section 321, the second section 322, and the third section 323, in this order. Thus, as shown in FIG. 5(b), the rotational direction sensor 13 generates the first high-level signal H1, the second high-level signal H2, and the third high-level signal H3, in this order. The signaling pattern shown in FIG. 5(b) is defined as a second signaling pattern that is different from the first signaling pattern of FIG. 5(a).

Each transmitter device 1–4 is attached to the corresponding tire T1–T4 such that the axis of the associated rotational direction sensor 13, or the axis around which the ball 34 rolls, is parallel with the axis of the tire T1–T4.

Figure 6A:
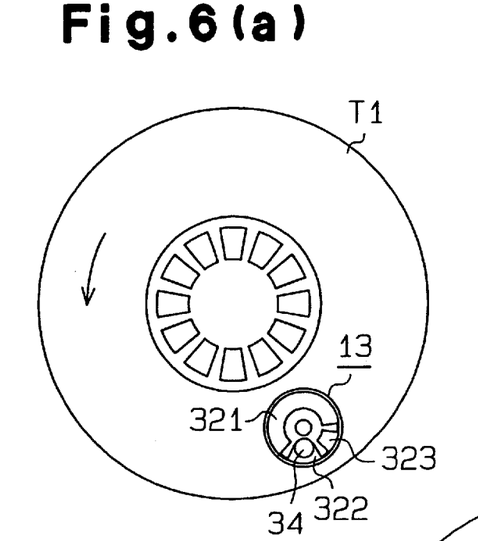
FIGS. 6(a) to 6(c) are views schematically explaining operation of the rotational direction sensor when the corresponding tire is rotating.
Figure 6B:
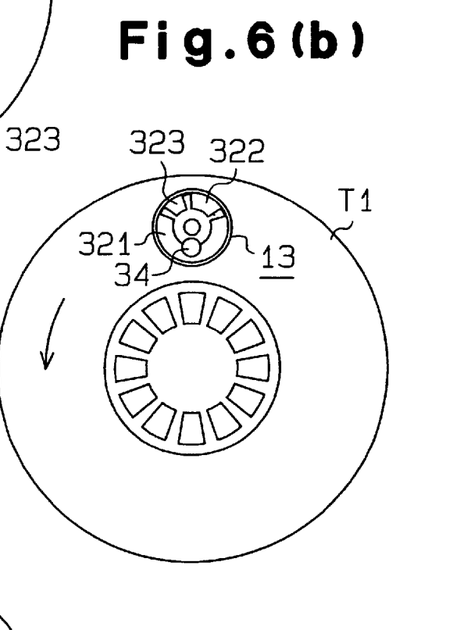
Figure 6C:
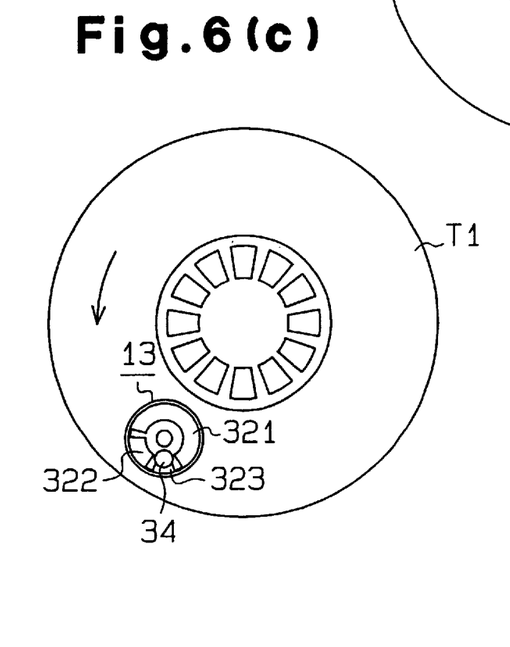

FIGS. 6(a), 6(b), and 6(c) schematically show the left, front tire T1 and the rotational direction sensor 13 that is located in the tire T1. If the tire T1 rotates at a relatively low speed, gravity acts on the ball 34 to maintain the ball 34 at the lowermost position of the annular passage 33 constantly.

In the state shown in FIG. 6(a), the ball 34 is located at a position in the annular passage 33 that corresponds to the second section 322. If the vehicle V proceeds forward and the tire T1 rotates counterclockwise from the state of FIG. 6(a) to the state of FIG. 6(b), as viewed in the drawings, the ball 34 rolls clockwise relative to the annular passage 33 until it is located at a position that corresponds to the first section 321. If the tire T1 further rotates counterclockwise from the state of FIG. 6(b) to the state of FIG. 6(c), the ball 34 further rolls clockwise relative to the annular passage 33 until it is located at a position that corresponds to the third section 323. Accordingly, when the vehicle V proceeds forward, the rotational direction sensor 13 in the tire T1 generates signals in accordance with the first signaling pattern of FIG. 5(a).

The first, second, third, and fourth transmitter devices 1–4, which are attached to the four tires T1–T4, respectively, have identical mechanical structures. Thus, when the vehicle V proceeds forward, the rotational direction sensor 13 in the left, rear tire T3 generates signals in accordance with the first signaling pattern, like the rotational direction sensor 13 in the left, front tire T1.

The right, front and rear tires T2, T4 are located at positions opposite to the left, front and rear tires T1, T3, respectively, with respect to a hypothetical vertical plane that includes the longitudinal axis of the vehicle V. Thus, when the vehicle V proceeds forward, unlike the rotational direction sensors 13 in the left, front and rear tires T1, T3, the rotational direction sensors 13 in the right, front and rear tires T2, T4 each generate signals in accordance with the second signaling pattern.

If the rotational direction sensor 13 replaces a high-level signal with a low-level signal or a low-level signal with a high-level signal, the controller 10 of each transmitter device 1–4 starts analyzing the signaling pattern of the signals from the corresponding rotational direction sensor 13. If at least one signaling cycle is completed by the rotational direction sensor 13, the controller 10 judges whether the signaling pattern is the first signaling pattern or the second signaling pattern. The controller 10 then stores data that represents the judged signaling pattern in an internal memory, for example, the RAM.

The controller 10 may judge the signaling pattern every time the rotational direction sensor 13 completes one signaling cycle. Alternatively, the controller 10 may judge the signaling pattern every time the rotational direction sensor 13 completes a plurality of signaling cycles. However, the tires T1–T4 are not always rotating at a constant speed. Thus, for correct judgment, it is preferred that the controller 10 performs the judgment when the rotational direction sensor 13 completes a plurality of signaling patterns. After each judgment, the controller 10 rewrites the data stored in the internal memory such that only the latest data is stored in the memory.

If the rotational speed of the tires T1–T4 varies rapidly, the controllers 10 may receive signals in accordance with a signaling pattern that is different from the signaling patterns of FIGS. 5(a) and 5(b). In this case, the controllers 10 do not determine the signaling pattern.

If a signal generated by the rotational direction sensor 13 remains in a high-level state or a low-level state for a predetermined time or longer, the controller 10 discontinues the analysis of the signaling pattern. That is, if the vehicle V is stopped and the tires T1–T4 are not rotating, the signaling pattern is not analyzed. Further, if each tire T1–T4 rotates at a relatively high speed, centrifugal force acts to press the ball 34 to the electrode plates 31, 32 of the corresponding rotational direction sensor 13. The ball 34 is thus maintained at one position in the case 30 of the rotational direction sensor 13. Thus, if the vehicle V travels at a relatively high speed, the signaling pattern is not analyzed. In other words, the signaling pattern is analyzed mainly when the vehicle V travels at a relatively low speed.

The controller 10 of each rotational direction sensor 13 wirelessly transmits data that represents the signaling pattern stored in the internal memory, together with the data that represents the pressure and temperature in the corresponding tire T1–T4.

Next, the receiver 5 will be described with reference to FIGS. 1 and 3. The receiver 5 is powered by a battery (not shown) of the vehicle V, when, for example, a key switch (not shown) of the vehicle V is turned on.

As shown in FIG. 1, a front reception antenna 21 is located in a front portion of the vehicle V's body frame at a position that substantially corresponds to the left and right front tires T1, T2. A rear reception antenna 22 is located in a rear portion of the body frame at a position that substantially corresponds to the left and right rear tires T3, T4. The front reception antenna 21 is connected to the receiver 5 through a cable 21a, and the rear reception antenna 22 is connected to the receiver 5 through a cable 22a.

When one transmitter device 1–4 transmits a radio signal, the reception antennas 21, 22 each receive the radio signal. Each reception antenna 21, 22 induces voltage that corresponds to the field strength of the radio signal and sends a signal that represents the induced voltage to the receiver 5. The level of the voltage induced by each reception antenna 21, 22 varies in accordance with the position of the transmitter device 1–4 that has transmitted the radio signal relative to the reception antenna 21, 22. Thus, if one of the first and second transmitter devices 1, 2 that are attached to the corresponding front tires T1, T2 transmits a radio signal, the level of the voltage induced by the front reception antenna 21 is larger than the level of the voltage induced by the rear reception antenna 22. In contrast, if one of the third and fourth transmitter devices 3, 4 that are attached to the corresponding rear tires T3, T4 transmits a radio signal, the level of the voltage induced by the front reception antenna 21 is smaller than the level of the voltage induced by the rear reception antenna 22.

Figure 3:
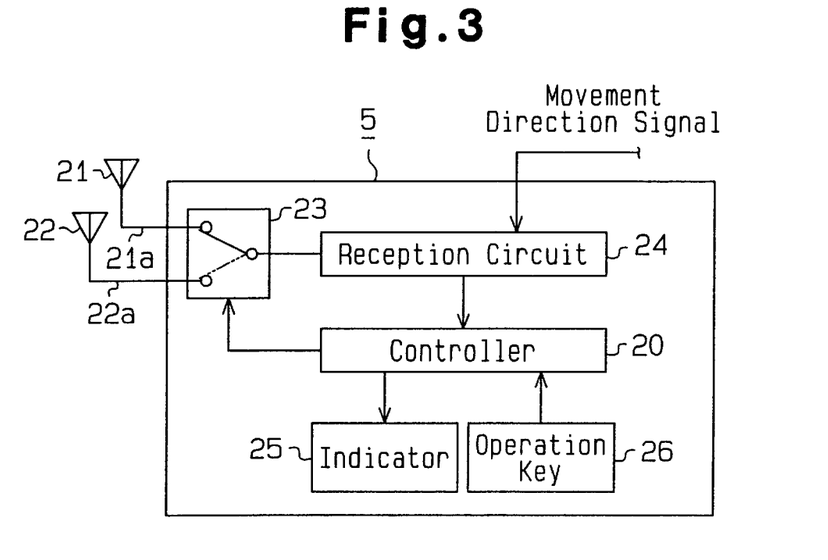
FIG. 3 is a block diagram showing a circuit of a receiver of the tire condition monitoring apparatus of FIG. 1.

As shown in FIG. 3, the receiver 5 includes a controller 20, which is, for example, a microcomputer. The controller 20, which functions as a control means, includes, for example, a CPU, an RAM, and an ROM. The receiver 5 also includes a switch circuit 23 and a reception circuit 24. The switch circuit 23 is connected to the reception antennas 21, 22 through the associated cables 21a, 22a. The reception circuit 24 is connected to the switch circuit 23. The controller 20 controls the switch circuit 23 to selectively connect the front reception antenna 21 or the rear reception antenna 22 to the reception circuit 24.

The switch circuit 23 sends a voltage signal to the reception circuit 24. The reception circuit 24 decodes and demodulates the voltage signal and sends the signal to the controller 20. The controller 20 derives necessary data such as the data that represents the tire condition from the signal transmitted by the reception circuit 24. The controller 20 stores the acquired information in an internal memory, for example, the RAM, and indicates the information on an indicator 25 that is located in the vehicle V's passenger compartment, as needed. An operation key 26 is also located in the passenger compartment. The operation key 26 is manually operable to select various functions of the tire condition monitoring apparatus.

The controller 20 receives a signal that represents the direction in which the vehicle V is moving (a movement direction signal) from a directional indicator device of the vehicle V, for example, a device connected to the vehicle's transmission (not shown). The directional indicator device provides the controller 20 with a signal that represents the shift position of a shift lever as the movement direction signal. The controller 20 judges whether the vehicle V is moving forward or rearward in accordance with the movement direction signal. That is, the controller 20 determines that the vehicle V is moving rearward only when the shift lever is located at the reverse position. The controller 20 otherwise determines that the vehicle V is moving forward.

When neither the front or rear reception antenna 21, 22 receives a radio signal from any transmitter device 1–4, the controller 20 controls the switch circuit 23 to connect one of the antennas 21, 22 to the reception circuit 24. In this embodiment, the controller 20 connects the front reception antenna 21 to the reception circuit 24 when neither the front or rear reception antenna 21, 22 is receiving a radio signal from any transmitter device 1–4.

When one transmitter device 1–4 transmits a radio signal, the front and rear reception antennas 21, 22 both receive the radio signal. Each reception antenna 21, 22 then induces a voltage signal that corresponds to the field strength of the radio signal. Since the front reception antenna 21 is connected to the reception circuit 24 by default, as described, a signal from the front reception antenna 21 is sent to the controller 20. The controller 20 then initiates a procedure for determining which transmitter device has transmitted the radio signal.

More specifically, the controller 20 first determines the level of the voltage signal from the front reception antenna 21. The controller 20 then controls the switch circuit 23 to connect the rear reception antenna 22 to the reception circuit 24. In this state, the controller 20 determines the level of the voltage signal from the rear reception antenna 22.

Next, the controller 20 compares the levels of the two voltage signals and determines which reception antenna has generated the highest level voltage signal. The controller 20 then selects the two transmitter devices that are located closer to the determined reception antenna, either the front transmitter devices 1, 2 or the rear transmitter devices 3, 4. Subsequently, the controller 20 controls the switch circuit 23 to connect the reception antenna that has generated the highest voltage signal to the reception circuit 24.

The controller 20 receives signals from the reception antenna 24 and derives necessary data, which includes the data that represents the tire condition, the data that represents the signaling pattern, and the ID code, from the signals. The controller 20 judges whether the signals indicate the first signaling pattern or the second signaling pattern. Accordingly, the controller 20 determines which transmitter device has transmitted the data in accordance with the signaling pattern indicated by the corresponding data and the aforementioned movement direction signal.

If the data has been transmitted from either the first transmitter device 1 attached to the left, front tire T1 or the second transmitter device 2 attached to the right, front tire T2, the level of the voltage signal generated by the front reception antenna 21, which is located closer to the front transmitter devices 1, 2, is larger than that of the voltage signal generated by the rear reception antenna 22, which is spaced further from the transmitter devices 1, 2. The controller 20 thus selects the first and second transmitter devices 1, 2 that are located closer to the front reception antenna 21 and connects the front reception antenna 21 to the reception circuit 24.

Subsequently, the controller 20 judges whether the data that represents the signaling pattern, which is included in the signal from the front reception antenna 21, indicates the first signaling pattern or the second signaling pattern. The controller 20 further determines in which direction the vehicle V is moving based on the movement direction signal. As has been described with reference to FIGS. 6(a) to 6(c), if the vehicle V is moving forward, the data from the first transmitter device 1 attached to the left, front tire TI includes the signaling pattern data that indicates the first signaling pattern. In contrast, even if the vehicle V is moving forward, the data from the second transmitter device 2, which is attached to the right, front tire T2, includes data that indicates the second signaling pattern.

Accordingly, if the controller 20 determines that the signaling pattern data indicates the first signaling pattern and that the vehicle V is moving forward, the controller 20 judges that the first transmitter device 1 has transmitted the data. However, if the controller 20 determines that the signaling pattern data indicates the second signaling pattern and that the vehicle V is moving forward, the controller 20 judges that the second transmitter device 2 has transmitted the data.

In contrast, if the controller 20 determines that the signaling pattern data indicates the first signaling pattern and that the vehicle V is moving rearward, the controller 20 judges that the second transmitter device 2 has transmitted the data. However, if the controller 20 determines that the signaling pattern data indicates the second signaling pattern and that the vehicle V is moving rearward, the controller 20 judges that the first transmitter device 1 has transmitted the data.

In this manner, the controller 20 determines which transmitter device has transmitted the data. That is, the controller 20 associates the data that represents the tire condition and the ID code with the tire that corresponds to the transmitter device that has transmitted the data. In other words, the controller 20 reliably determines which tire of the vehicle V corresponds to the received data that represents the tire condition.

In this embodiment, the receiver 5 is capable of determining which transmitter device has transmitted the data without pre-storing the ID codes of the first to fourth transmitter devices 1–4 attached to the corresponding tires T1–T4. Further, it is unnecessary for a user to associate the ID codes of the transmitter devices 1–4 with the positions of the tires T1–T4 to which the transmitter devices 1–4 are attached. Thus, even if a tire is replaced or is moved to another position relative to the vehicle V, the manual initial entry of the ID codes in the receiver 5 need not be repeated.

Further, only two reception antennas 21, 22 are provided for the four transmitter devices 1–4. Since the number of the reception antennas 21, 22 is relatively small, the tire condition monitoring apparatus is easily installed in the vehicle V.

The illustrated embodiment may be modified as follows.

The controller 20 may receive the movement direction signal from a device other than the transmission device, as long as that device is capable of determining the direction in which the vehicle V is moving.

The rotational direction sensor 13 does not necessarily have to be configured as shown in FIGS. 4(a) to 4(c). More specifically, the cut-away electrode plate 32 may be divided into four or more sections. Alternatively, unlike the illustrated embodiment, the sections may have equal circumferential dimensions, while the cut-away portions have different circumferential dimensions.

The rotational direction sensor 13 does not necessarily have to be operated depending on whether or not the electrode plates 31, 32 are electrically connected to each other, as shown in FIGS. 4(a) to 4(c). The rotational direction sensor 13 may be operated in any other manner as long as the sensor 13 generates a signal with a specific pattern when the corresponding tire rotates. For example, the rotational direction sensor 13 may employ a rotary encoder or an optical sensor. Alternatively, the conductive ball 34 may be replaced with a non conductive member so that the sensor 13 generates a signal that corresponds to changes of the capacitance between electrode plates 31, 32.

Therefore, the present examples and embodiments are to be considered as illustrative and not restrictive and the invention is not to be limited to the details given herein, but may be modified within the scope and equivalence of the appended claims.

What is claimed is:

1. A tire condition monitoring apparatus for monitoring the condition of a plurality of tires attached to a vehicle, wherein the tires include left and right front tires and left and right rear tires, the apparatus comprising:
    a transmitter device, which is attached to each tire, wherein the transmitter device has a condition sensor that detects the condition of the corresponding tire and a signal generator that generates a specific pattern signal when the tire rotates, wherein the pattern signal generated by the signal generator of the transmitter device attached to each left tire is different from the pattern signal generated by the signal generator of the transmitter device attached to each right tire when the vehicle moves in a given direction, and each transmitter device transmits a radio signal that includes data that represents the tire condition and data that represents the pattern signal;
    a front reception antenna, which is installed in a body of the vehicle at a position that is relatively near to the left and right front tires, wherein the front reception antenna receives radio signals from the transmitter devices;
    a rear reception antenna, which is installed in the vehicle body at a position that is relatively near to the left and right rear tires, wherein the rear reception antenna receives radio signals from the transmitter devices; and
    a receiver, which receives reception signals from the front and rear reception antennas, wherein the receiver includes a controller, and wherein, when one of the transmitter devices has transmitted a radio signal, the controller determines which transmitter device has transmitted the radio signal in accordance with the level of reception signals from the reception antennas and the data that represents the pattern signal, which is included in the radio signal transmitted by the transmitter device.

2. The apparatus as set forth in claim 1, wherein the receiver further includes a switch circuit that selectively connects the front reception antenna or the rear reception antenna to the controller.

3. The apparatus as set forth in claim 1, wherein each signal generator generates a first pattern signal when the corresponding tire rotates in one direction, and each signal generator generates a second pattern signal, which is different from the first pattern signal, when the tire rotates in the other direction.

4. The apparatus as set forth in claim 3, wherein the signal generators that correspond to the left front and rear tires generate the first pattern signals and the signal generators that correspond to the right front and rear tires generate the second pattern signals if the vehicle moves forward, and the signal generators that correspond to the left front and rear tires generate the second pattern signals and the signal generators that correspond to the right front and rear tires generate the first pattern signals if the vehicle moves rearward.

5. The apparatus as set forth in claim 3, wherein each signal generator includes:
    a case, in which an annular passage is formed; and
    a movable body, which is located in the annular passage, wherein the movable body moves in the annular passage circumferentially in the case when the corresponding tire rotates, and the direction in which the movable body moves changes in accordance with the direction in which the tire rotates.

6. The apparatus as set forth in claim 5, wherein each signal generator generates the first pattern signal when the movable body moves in one direction and generates the second pattern signal when the movable body moves in the other direction.

7. The apparatus as set forth in claim 5, wherein the movable body is formed of a conductive material, and each signal generator further includes a pair of annular electrode plates, which are located in the annular passage and are electrically connected to each other through the movable body, and at least one electrode plate includes a plurality of non-conductive portions, each of which is circumferentially spaced from the adjacent non-conductive portion, by a predetermined interval, and the electrode plates are not electrically connected to each other when the movable body is located at a position corresponding to one of the non-conductive portions.

8. The apparatus as set forth in claim 7, wherein the non-conductive portions are cut-away portions formed in one electrode plate, and the cut-away portions divide the electrode plate into a plurality of sections, and the sections have different circumferential dimensions.

9. The apparatus as set forth in claim 1, wherein the controller determines which transmitter device has transmitted the radio signal in accordance with the direction of movement of the vehicle.

10. The apparatus as set forth in claim 1, wherein the controller first determines whether the front or the rear tires correspond to the reception antenna that generates the highest level signal, and the controller subsequently determines which of the transmitter devices of the determined tires has transmitted the radio signal, in accordance with the data that represents the pattern signal, which is included in the radio signal transmitted by the transmitter device.

11. A tire condition monitoring apparatus for monitoring the condition of a plurality of tires attached to a vehicle, wherein the tires include left and right front tires and left and right rear tires, the apparatus comprising:

a transmitter device, which is attached to each tire, wherein the transmitter device includes:
  a condition detecting means for detecting the condition of the corresponding tire;
  a signal generating means for generating a specific pattern signal when the tire rotates, wherein the pattern signal generated by the signal generating means of the transmitter device attached to each left tire is different from the pattern signal generated by the signal generating means of the transmitter device attached to each right tire when the vehicle moves in a given direction; and
  a transmitting means for transmitting a radio signal, the radio signal including data that represents the tire condition and data that represents the pattern signal;
a front reception antenna, which is installed in a body of the vehicle at a position that is relatively near to the left and right front tires, wherein the front reception antenna receives radio signals that are relatively strong from the transmitter devices of the left and right front tires;
a rear reception antenna, which is installed in the vehicle body at a position that is relatively near to the left and right rear tires, wherein the rear reception antenna receives radio signals that are relatively strong from the transmitter devices of the left and right rear tires;
a control means for receiving reception signals from the front reception antenna and the rear reception antenna; and
a switch means for selectively connecting the front reception antenna or the rear reception antenna to the control means, wherein, when one of the transmitter devices has transmitted a radio signal, the control means determines which transmitter device has transmitted the radio signal in accordance with the level of reception signals from the reception antennas and the data that represents the pattern signal, which is included in the radio signal transmitted by the transmitter device.

12. The apparatus as set forth in claim 11, wherein each signal generating means includes:
  a case, in which an annular passage is formed; and
  a movable body, which is located in the annular passage, wherein the movable body rolls in the annular passage circumferentially in the case when the corresponding tire rotates, and the direction in which the movable body rolls changes in accordance with the direction in which the tire rotates.

13. The apparatus as set forth in claim 12, wherein each signal generating means generates a first pattern signal when the movable body rolls in one direction and generates a second pattern signal, which is different from the first pattern signal, when the movable body rolls in the other direction.

14. The apparatus as set forth in claim 12, wherein the movable body is formed of a conductive material, and each signal generating means further includes a pair of annular electrode plates, which are located in the annular passage and are electrically connected to each other through the movable body, and at least one electrode plate includes a plurality of non-conductive portions, each of which is circumferentially spaced from the adjacent non-conductive portion, by a predetermined interval, and the electrode plates are not electrically connected to each other when the movable body is located at a position corresponding to one of the non-conductive portions.

15. The apparatus as set forth in claim 14, wherein the non-conductive portions are cut-away portions formed in one electrode plate, and the cut-away portions divide the electrode plate into a plurality of sections, and the sections have different circumferential dimensions.

16. The apparatus as set forth in claim 11, wherein the control means determines which transmitter device has transmitted the radio signal in accordance with the direction of movement of the vehicle.

17. The apparatus as set forth in claim 11, wherein the control means first determines whether the front or the rear tires correspond to the reception antenna that generates the highest level signal, and the control means subsequently determines which of the transmitter devices of the determined tires has transmitted the radio signal, in accordance with the data that represents the pattern signal, which is included in the radio signal transmitted by the transmitter device.

18. A tire condition monitoring method for monitoring the condition of a plurality of tires attached to a vehicle, wherein the tires include left and right front tires and left and right rear tires, the method comprising:
  detecting the condition of each tire;
  generating a specific pattern signal for each tire when the tires rotate, wherein the pattern signal generated for each left tire is different from the pattern signal generated for each right tire;
  transmitting a radio signal from one of the tires, the radio signal including data that represents the tire condition and data that represents the pattern signal;
  receiving the radio signal at a front location that is relatively near to the front tires;
  receiving the radio signal at a rear location that is relatively near to the rear tires; and
  determining which tire has transmitted the radio signal in accordance with the level of signals received at the front and rear locations and the data that represents the pattern signal, which is included in the transmitted radio signal.

* * * * *